(12) United States Patent
Fukuda

(10) Patent No.: US 12,518,363 B2
(45) Date of Patent: Jan. 6, 2026

(54) IMAGE PROCESSING APPARATUS, IMAGE PROCESSING METHOD, IMAGE PROCESSING SYSTEM, AND STORAGE MEDIUM WITH PIECEWISE LINEAR FUNCTION FOR TONE CONVERSION ON IMAGE

(71) Applicant: CANON KABUSHIKI KAISHA, Tokyo (JP)

(72) Inventor: Yasuo Fukuda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 389 days.

(21) Appl. No.: 18/152,283

(22) Filed: Jan. 10, 2023

(65) Prior Publication Data

US 2023/0230216 A1    Jul. 20, 2023

(30) Foreign Application Priority Data

Jan. 19, 2022    (JP) ................................ 2022-006428

(51) Int. Cl.
*G06T 5/92*    (2024.01)
*G06T 5/40*    (2006.01)

(52) U.S. Cl.
CPC . *G06T 5/92* (2024.01); *G06T 5/40* (2013.01)

(58) Field of Classification Search
CPC .... G06T 5/40; G06T 7/90; G06T 5/80; G06T 5/92; G06T 5/20
See application file for complete search history.

(56) References Cited

U.S. PATENT DOCUMENTS

| 7,689,065 | B2 | 3/2010 | Fukuda |
| 8,526,729 | B2 | 9/2013 | Mitsunaga |
| 2007/0172224 | A1* | 7/2007 | Yukitake ............ H04N 23/632 396/287 |
| 2009/0141176 | A1* | 6/2009 | Tomisaka ............ G09G 3/2007 348/E5.061 |
| 2011/0222767 | A1 | 9/2011 | Mitsunaga |

FOREIGN PATENT DOCUMENTS

| JP | H11331598 A | * 11/1999 | ........... H04N 5/2353 |
| JP | 2004-032427 A | 1/2004 | |
| JP | 2011-188391 A | 9/2011 | |
| JP | 2012-221208 A | 11/2012 | |
| JP | 2020-146381 A | 9/2020 | |

OTHER PUBLICATIONS

Jul. 8, 2025 Japanese Official Action in Japanese Patent Appln. No. 2022-006428.

* cited by examiner

*Primary Examiner* — Sumati Lefkowitz
*Assistant Examiner* — Connor L Hansen
(74) *Attorney, Agent, or Firm* — Venable LLP

(57) ABSTRACT

A piecewise linear function for image tone conversion is easily corrected. An image processing apparatus first obtains a piecewise linear function for image tone conversion. Next, the image processing apparatus performs correction, in a case where the magnitude of the slope of the piecewise linear function in a processing target piece is larger than a predefined upper limit value, on the piecewise linear function so as to bring the magnitude of the slope of the piecewise linear function in the processing target piece to the upper limit value by changing the value of the end point of the processing target piece. The image processing apparatus performs the correction sequentially on a piece adjacent to the processing target piece.

12 Claims, 11 Drawing Sheets

| INPUT VALUE | CALCULATED VALUE (SLOPE: 0.7) | OUTPUT VALUE (ROUNDED) |
|---|---|---|
| 0 | 0.0 | 0 |
| 1 | 0.7 | 1 |
| 2 | 1.4 | 1 |
| 3 | 2.1 | 2 |
| 4 | 2.8 | 3 |
| 5 | 3.5 | 4 |
| 6 | 4.2 | 4 |
| 7 | 4.9 | 5 |
| 8 | 5.6 | 6 |
| 9 | 6.3 | 6 |

FIG.4A

| INPUT VALUE | CALCULATED VALUE (SLOPE: 1.3) | OUTPUT VALUE (ROUNDED) |
|---|---|---|
| 0 | 0.0 | 0 |
| 1 | 1.3 | 1 |
| 2 | 2.6 | 3 |
| 3 | 3.9 | 4 |
| 4 | 5.2 | 5 |
| 5 | 6.5 | 7 |
| 6 | 7.8 | 8 |
| 7 | 9.1 | 9 |
| 8 | 10.4 | 10 |
| 9 | 11.7 | 12 |

FIG.4B

IMAGE PROCESSING APPARATUS, IMAGE PROCESSING METHOD, IMAGE PROCESSING SYSTEM, AND STORAGE MEDIUM WITH PIECEWISE LINEAR FUNCTION FOR TONE CONVERSION ON IMAGE

BACKGROUND

Field

The present disclosure relates to an image tone conversion technique.

Description of the Related Art

As an approach of image conversion for, e.g., reducing the data volume of image data or performing image correction, there is an approach that converts the tones of an image by performing tone mapping on image data using a piecewise linear function. A piecewise linear function is a group of functions set by dividing the range of explanatory variables into a plurality of pieces (hereinafter also referred to as "bins") and defining a function for each of the bins as a linear function. To apply a piecewise linear function to image tone conversion, the range of signal values (hereinafter also referred to as "pixel values") of data on an image to be converted (hereinafter referred to as an "input image") is divided into some bins, and a linear function indicating the input-output relation is defined for each bin, thereby defining a piecewise linear function. Tone mapping on image data using a piecewise linear function is to convert each pixel value in the input image data by using the piecewise linear function thus defined and to obtain data on a converted image (hereinafter referred to as an "output image"). In particular, tone conversion performed to reduce the total number of tones in output image data compared to the total number of tones in input image data is also called tone compression.

In a case where a pixel value in the output image data obtained by tone compression is an integer value, the tone may be crushed depending on the slope of the linear function corresponding to each bin in the piecewise linear function. However, in tone compression for the purpose of reducing the data volume of input image data, there is a trade-off between shortening the bit length of each pixel value and the tone crushing. Thus, to achieve favorable tone compression, it is preferable to determine the piecewise linear function dynamically according to, e.g., the distribution of pixel values of an image.

Japanese Patent Laid-Open No. H11-331598 discloses a technique, for use in the field of image correction technology, of correcting a piecewise linear function obtained based on a histogram of input image data based on the maximum tone value in the histogram and performing image conversion using the corrected piecewise linear function. Specifically, in the technique disclosed in Japanese Patent Laid-Open No. H11-331598, first, the number of tone values in each bin (hereinafter also referred to as a frequency) in a histogram is divided by the total number of pixels to normalize the frequencies of the bins. Next, a piecewise linear function based on the histogram is obtained by calculating the slopes of linear functions for the respective bins of the piecewise linear function using the above normalization. Further, the piecewise linear function obtained based on the histogram is corrected by setting a slope's upper or lower limit value to the slopes of the linear functions for the bins of the piecewise linear function based on the magnitude of the maximum tone value in the histogram.

However, in the technique disclosed in Japanese Patent Laid-Open No. H11-331598, the value of the objective variable for the final bin of the corrected piecewise linear function may not coincide with a normalized value obtained by dividing, by the total number of pixels, a cumulative tone value which is obtained by cumulatively adding tone values up to the final bin in the histogram. Thus, the technique disclosed in Japanese Patent Laid-Open No. H11-331598 requires the histogram to be renormalized after setting the slope's upper or lower limit value to the slopes of the linear functions for the bins of the piecewise linear function obtained based on the histogram.

SUMMARY

An image processing apparatus of the present disclosure is an image processing apparatus that performs tone conversion on an image, the image processing apparatus comprising: one or more hardware processors; and one or more memories storing one or more programs configured to be executed by the one or more hardware processors, the one or more programs including instructions for: obtaining a piecewise linear function for the tone conversion; and performing correction, in a case where a magnitude of a slope of the piecewise linear function in a processing target piece is larger than a predefined upper limit value, on the piecewise linear function so as to bring the magnitude of the slope of the piecewise linear function in the processing target piece to the upper limit value by changing a value of an end point of the processing target piece, wherein the correction is performed sequentially on a piece adjacent to the processing target piece.

Further features of the present invention will become apparent from the following description of exemplary embodiments with reference to the attached drawings.

BRIEF DESCRIPTION OF THE DRAWINGS

FIGS. 4A and 4B are diagrams showing the correspondence relations among input values, calculated values, and output values of a piecewise linear function in a given piece;

DESCRIPTION OF THE EMBODIMENTS

Hereinafter, with reference to the attached drawings, the present invention is explained in detail in accordance with preferred embodiments. Configurations shown in the following embodiments are merely exemplary and the present invention is not limited to the configurations shown schematically.

First Embodiment

Figure 1:
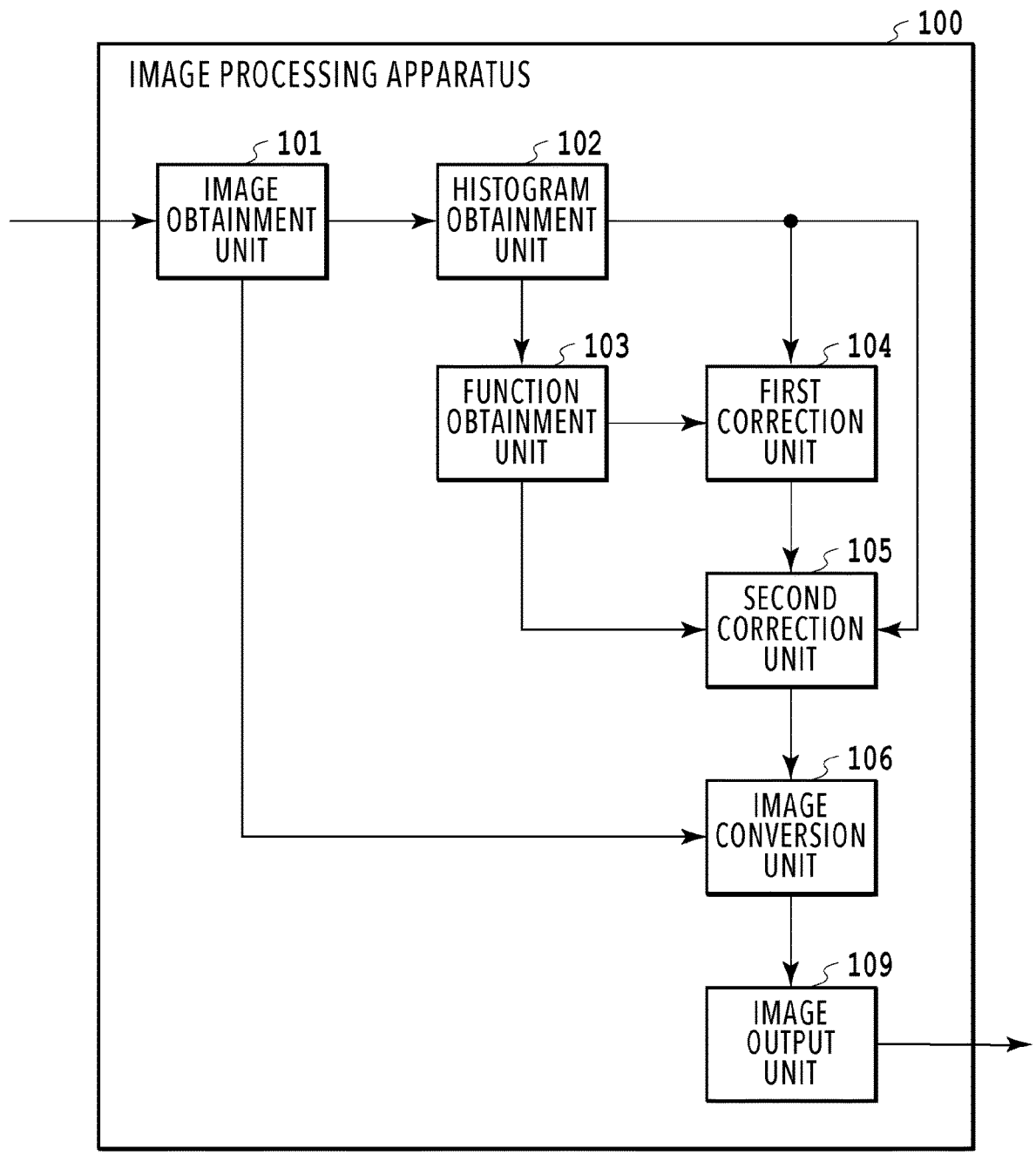
FIG. 1 is a block diagram showing an example functional block configuration of an image processing apparatus according to a first embodiment.

With reference to FIGS. 1 to 9, an image processing apparatus 100 according to a first embodiment is described. First, the configuration of the image processing apparatus 100 is described with reference to FIGS. 1 and 2. FIG. 1 is a block diagram showing an example functional block configuration of the image processing apparatus 100 according to the first embodiment. The image processing apparatus 100 has an image obtainment unit 101, a histogram obtainment unit 102, a function obtainment unit 103, a first correction unit 104, a second correction unit 105, an image conversion unit 106, and an image output unit 109. Processing by each unit in the image processing apparatus 100 is implemented by hardware such as an application-specific integrated circuit (ASIC) incorporated in the image processing apparatus 100. Processing by each unit in the image processing apparatus 100 may also be implemented by hardware such as a field-programmable gate array (FPGA) incorporated in the image processing apparatus 100. The processing may also be implemented by software using a central processor unit (CPU) or a graphic processor unit (GPU) and memory. The processing by each unit in the image processing apparatus 100 will be described later.

Figure 2:
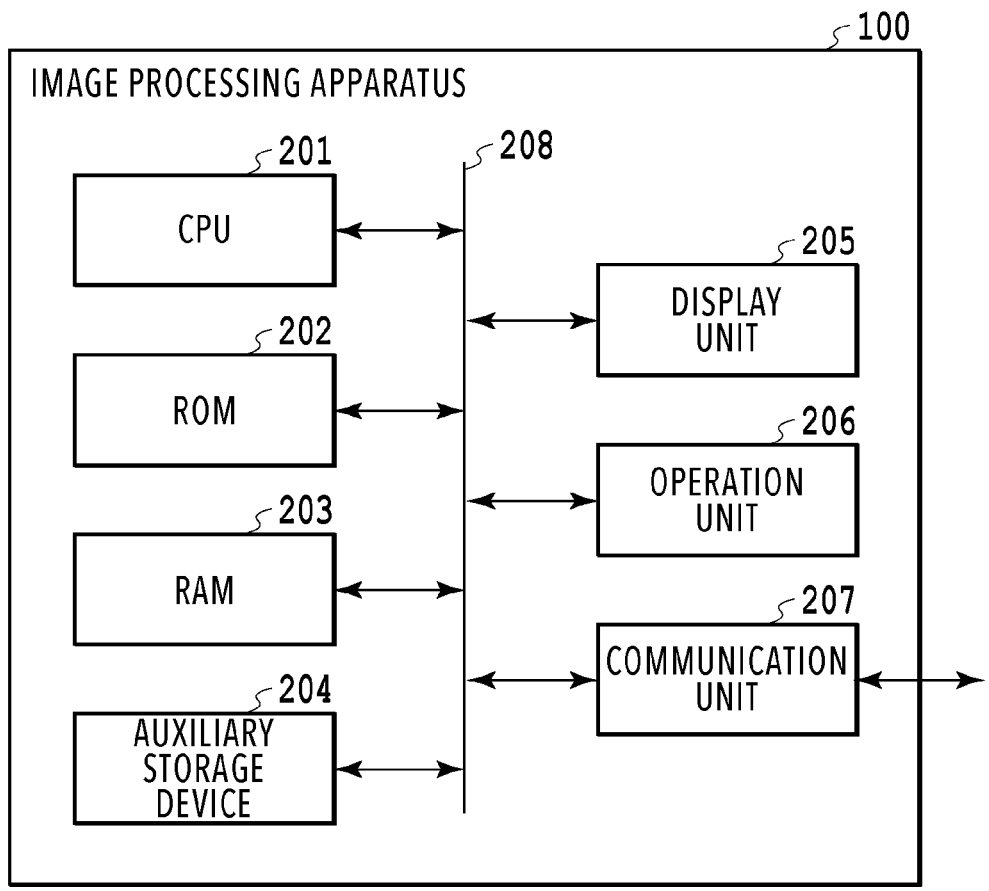
FIG. 2 is a block diagram showing an example hardware configuration of the image processing apparatus according to the first embodiment.

FIG. 2 is a block diagram showing an example hardware configuration of the image processing apparatus 100 according to the first embodiment. Specifically, the block diagram shown in FIG. 2 shows an example hardware configuration of the image processing apparatus 100 in a case where each unit in the image processing apparatus 100 operates as software. The image processing apparatus 100 is formed of a computer which has, as exemplified in FIG. 2, a CPU 201, a ROM 202, a RAM 203, an auxiliary storage device 204, a display unit 205, an operation unit 206, a communication unit 207, and a bus 208.

The CPU 201 causes the computer to function as the units in the image processing apparatus 100 shown in FIG. 1 by controlling the computer using programs and data stored in the ROM 202 or the RAM 203. Note that the image processing apparatus 100 may have one or more pieces of dedicated hardware besides the CPU 201, and the dedicated hardware may execute at least part of the processing performed by the CPU 201. Examples of the dedicated hardware include an ASIC, an FPGA, and a digital signal processor (DSP). The ROM 202 stores programs and the like that do not need to be changed. The RAM 203 temporarily stores, e.g., programs or data supplied from the auxiliary storage device 204 or data supplied from the outside via the communication unit 207. The auxiliary storage device 204 is formed by, for example, a hard disk drive or the like, and stores various kinds of data such as image data or audio data.

The display unit 205 is formed of, for example, a liquid crystal display, an LED, or the like, and displays, e.g., a graphical user interface (GUI) for a user to operate the image processing apparatus 100 or view information. The operation unit 206 is formed of, for example, a keyboard, a mouse, a touch panel, or the like and inputs various instructions to the CPU 201 in response to a user's operation. The operation unit 206 may be configured, in addition to the above configuration, to receive a user's gesture operation by using publicly-known gesture recognition processing. In this case, the operation unit 206 has a configuration to obtain image data through visible light, infrared light, or the like and a configuration to recognize a user's operation from the image data thus obtained and convert the operation into a command. Also, the operation unit 206 may be configured to receive a user's voice operation by using publicly-known voice recognition processing. In this case, the operation unit 206 has a configuration to recognize a user's speech from audio data outputted from a sound collection device such as a microphone and convert the speech into a command.

The CPU 201 also operates as a display control unit that controls the display unit 205 and an operation control unit that controls the operation unit 206. The communication unit 207 is used for communications with apparatuses outside the image processing apparatus 100. For example, in a case where the image processing apparatus 100 is connected to an external apparatus in a wired manner, a communication cable is connected to the communication unit 207. In a case where the image processing apparatus 100 has a function to wirelessly communicate with external apparatuses, the communication unit 207 has an antenna. The bus 208 links the units in the image processing apparatus 100 and communicates information thereamong. Although the display unit 205 and the operation unit 206 are described in the first embodiment as being located inside the image processing apparatus 100, at least one of the display unit 205 and the operation unit 206 may be located outside of the image processing apparatus 100 as a different apparatus.

Processing by each unit in the image processing apparatus 100 is now described. The image obtainment unit 101 obtains data on an input image (hereinafter referred to as "input image data"). Specifically, for example, the image obtainment unit 101 obtains input image data by reading the input image data stored in the auxiliary storage device 204 from the auxiliary storage device 204. The image obtainment unit 101 may obtain, via the communication unit 207, input image data outputted from an external apparatus, or may obtain a signal outputted from an image sensor such as a CMOS image sensor as input image data. In a case where the image obtainment unit 101 obtains a signal outputted from an image sensor, the image obtainment unit 101 may include an A/D converter such as an analog-to-digital conversion circuit and generate and obtain input image data by converting the signal into a digital signal.

The histogram obtainment unit 102 generates and obtains a histogram of an input image based on the input image data obtained by the image obtainment unit 101. The function obtainment unit 103 generates and obtains a piecewise linear function for tone conversion based on the histogram of the input image obtained by the histogram obtainment unit 102.

Figure 3A:
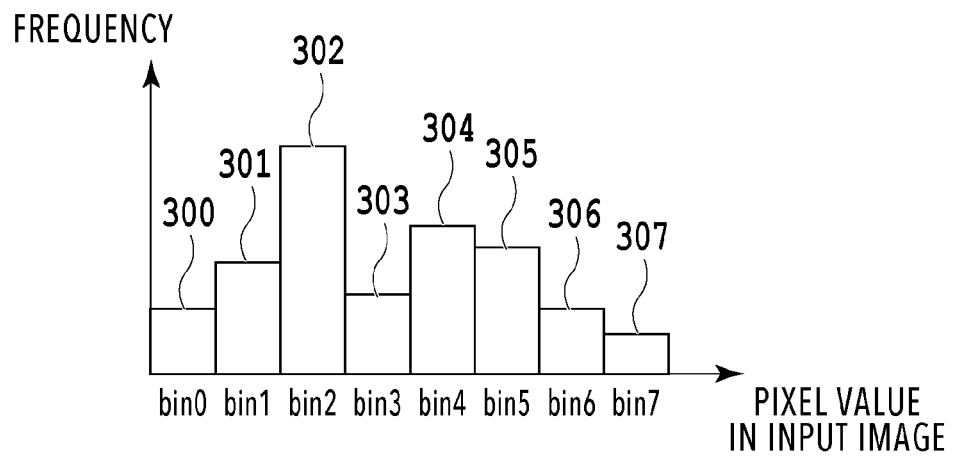
FIG. 3A is a diagram showing an example of a histogram of an input image according to the first embodiment.
Figure 3B:
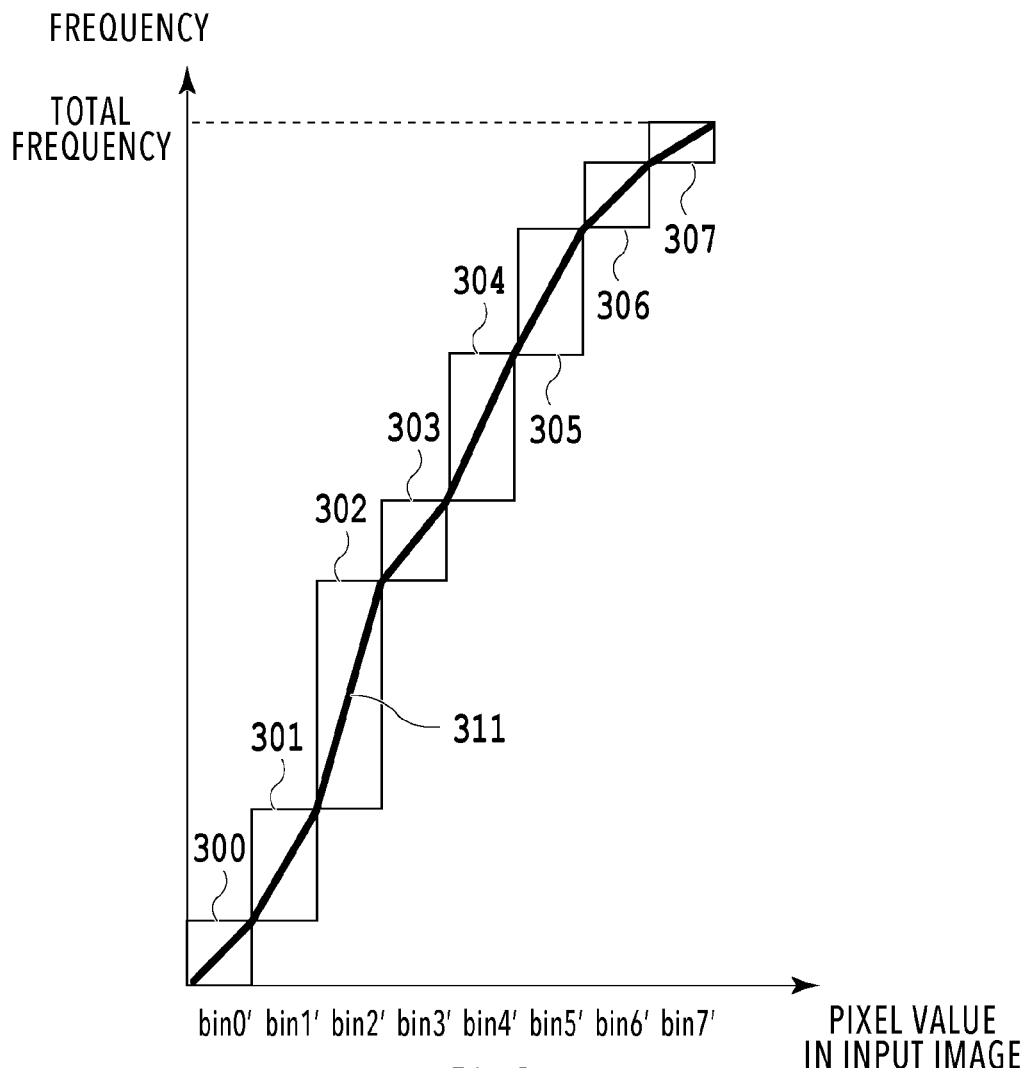
FIG. 3B is a diagram showing an example of a cumulative histogram obtained by cumulatively adding the frequencies of bins in the histogram shown in FIG. 3A.

With reference to FIGS. 3A and 3B, a method for generating the histogram and a method for generating the piecewise linear function are described. The following description assumes that the histogram generated by the histogram obtainment unit 102 has eight pieces (hereinafter also referred to as "bins"). Note that the number of the bins of a histogram is not limited to eight and may be seven or less or nine or more as long as there are two or more bins. It is preferable that the number of bins of a histogram generated by the histogram obtainment unit 102 be a number equivalent to a value equal to or below a value obtained by dividing the size of the range of possible pixel values for each pixel in an input image by the size of the range of possible pixel values for each pixel in an output image. Setting the number of bins of a histogram to a number equivalent to the above-described value allows the size of the range of possible pixel values for pixels belonging to each bin to be equal to or smaller than the size of the range of possible pixel values for each pixel in an output image. The following description uses an example where the value obtained by dividing the size of the range of possible pixel values for each pixel in an input image by the size of the range of possible pixel values for each pixel in an output image is eight. In other words, the following description assumes that the size of the range of possible pixel values for pixels belonging to each bin of a histogram and the size of the range of possible pixel values for pixels in an output image are equal to each other.

FIGS. 3A and 3B are diagrams showing an example of a histogram and an example of a cumulative histogram, respectively, of an input image according to the first embodiment. The histogram exemplified in FIG. 3A has eight bins, namely, a bin0 to a bin7, and frequencies 300 to 307 indicate the frequencies of the respective bins. For example, the pixel value of each pixel in an input image is classified into one of eight bins, and the frequency of that bin is then incremented. Simply stated, for example, the pixel value of each pixel in an input image is divided by eight, and then the frequency of the bin (one of the bin0 to the bin7) which coincides with the product of the above division is incremented. Specifically, in a case where an input image is a grayscale image, for example, the pixel value of each pixel in the input image may be directly divided by 8, which is the number of bins. In a case where an input image is a color image of three RGB channels, for example, out of data on the three RGB channels corresponding to each pixel in the input image, the value of data on a particular channel, such as data on a G channel, may be divided by 8, which is the number of bins. In this case, for example, a configuration may be employed in which luminance or the like is calculated from data on the three RGB channels, the luminance value thus calculated is divided by 8, which is the number of bins, and the corresponding frequency is incremented, or a configuration may be employed in which the frequency is incremented irrespective of channels.

Note that a similar configuration may be employed in a case where a signal from an image sensor is a signal in the publicly-known Bayer format. Specifically, in a signal in the Bayer format, the pixel value of a pixel corresponding to a unit formed by 2×2 photodiodes has one piece of R-channel data, one piece of B-channel data, and two pieces of G-channel data. For example, averaging the two pieces of G-channel data simply makes the RGB channels have one piece of data each, and thus, processing similar to that for the above-described case of data of three RGB channels may be performed. Also, for example, one piece of R-channel data, one piece of B-channel data, and two pieces of G-channel data may be processed as is for each pixel. The histogram generation method described above is merely an example, and the method by which the histogram obtainment unit 102 generates a histogram is not limited to the one described above as long as a histogram of an input image can be generated.

FIG. 3B is a diagram showing an example of a cumulative histogram (also called a "cumulative frequency diagram") where the frequencies 300 to 307 of the respective bins of the histogram shown in FIG. 3A are cumulatively added together. A bin0' to a bin7' shown in FIG. 3B are bins corresponding to the bin0 to the bin7 shown in FIG. 3A, respectively. Here, the frequency of a binN' of the cumulative histogram shown in FIG. 3B (where N is an integer of 0 or greater and 7 or less) is a value obtained by totaling the frequencies of the bin0 to the binN shown in FIG. 3A. Thus, the frequency of the bin7' shown in FIG. 3B is a value totaling the frequencies of the bin0 to the bin7 shown in FIG. 3A and is therefore the sum of the frequencies of the bins shown in FIG. 3A, i.e., the total number of pixels in an input image (hereinafter also referred to as "the total frequency"). Note that the cumulative histogram may be generated either by the histogram obtainment unit 102 or the function obtainment unit 103, but the following description assumes that the cumulative histogram is generated by the histogram obtainment unit 102.

The function obtainment unit 103 generates and obtains a piecewise linear function based on the cumulative histogram generated by the histogram obtainment unit 102. Specifically, the function obtainment unit 103 first divides the frequency of each bin of the cumulative histogram shown in FIG. 3B by the total number of pixels (total frequency) in the input image. Here, a value obtained by dividing the frequency of the bin7' by the total number of pixels in the input image is 1.0 because the frequency of the bin7' is a value equivalent to the total number of pixels (total frequency) in the input image. Next, the function obtainment unit 103 multiplies the value obtained by the division of the frequency of each bin of the cumulative histogram by the total number of pixels (the total frequency) in the input image, by the maximum output tone level for histogram equalization. Specifically, for example, in a case where an output tone level is an integer value represented by a bit length of 8 bits, i.e., an integer value from 0 to 255, the function obtainment unit 103 multiplies the value obtained by the division of the frequency of each bin of the cumulative histogram by the total number of pixels (the total frequency) in the input image, by 255. As a result, the maximum value of the output tone level of the bin7' is 255. Further, the function obtainment unit 103 generates a piecewise linear function by linearly connecting, for each bin, the values of the frequencies of the bins in the above-modified cumulative histogram in which the frequency of each bin is a value from 0 to 255.

A group of line segments 311 formed by a plurality of line segments shown in FIG. 3B shows an example of a piecewise linear function generated by the function obtainment unit 103. The piecewise linear function generation method described above is merely an example, and the method by which the function obtainment unit 103 generates a piecewise linear function is not limited to the one described above as long as a piecewise linear function used for histogram equalization processing on an input image can be generated.

The histogram equalization can be performed by applying the piecewise linear function generated by the function obtainment unit 103 to the input image as a tone conversion function. However, in a case where tone compression is performed on an input image using the piecewise linear function generated simply based on a histogram as described above, there is a possibility that tone crushing may occur. The following describes tone crushing caused by tone compression on an input image using a piecewise linear function.

Tone compression using a piecewise linear function can be rephrased as processing of allocating output tones to input tone bins in a case where the number of output tones is less than the number of input tones defined by the bit length of the inputted pixel values. From this perspective, a publicly-known piecewise linear function generated by the function obtainment unit 103 and used for histogram equalization can be understood as being used to distribute tones according to the proportion of pixels belonging to each input tone piece.

With reference to FIGS. 4A and 4B, a specific example of a method for allocating tones to the input tone pieces is described. FIGS. 4A and 4B are diagrams showing the correspondence relations among input values, calculated values, and output values of a piecewise linear function in a given piece. Specifically, FIG. 4A is a diagram showing calculated values and output values of a piecewise linear function in a case where the slope of the piecewise linear function is 0.7, with input values to the piecewise linear function being integer values from 0 to 9. FIG. 4B is a diagram showing calculated values and output values of a piecewise linear function in a case where the slope of the piecewise linear function is 1.3, with input values to the piecewise linear function being integer values from 0 to 9. Referring to FIG. 4A, in a case where the input value is 1 or 2, the output value is 1 in either case. Similarly, in a case where the input value is 5 or 6, the output value is 4 in either case, and in a case where the input value is 8 or 9, the output value is 6 in either case. This means that the original tone cannot be kept and is lost as a result of applying tone conversion to the image, or in other words, image tone conversion can cause tone crushing. However, in a case where the object of tone conversion is tone compression, the possibility of the original tones being lost after tone conversion as described above has to be accepted more or less.

By contrast, referring to FIGS. 4B, 2, 6, and 11 do not appear as output values. In the case in FIG. 4B, tones are not lost like they are in FIG. 4A, but conversely, some output values do not appear. While 13 tones from 0 to 12 are allocated as output values to pieces 0 to 9 of input values, three tones out of them are not used. This means that redundant allocation is done, even though the purpose of tone conversion is tone compression. As described above, for example, in a case of creating a piecewise linear function for publicly-known histogram equalization, tones are distributed according to the proportion of pixels belonging to each piece. Thus, in a case where there are pixels concentratedly belonging to a certain piece, tones may be redundantly allocated to the piece where pixels are concentrated. Generally, in a case where the magnitude of the slope of a piecewise linear function is smaller than 1.0, there is a possibility that tone conversion of the image may cause tone crushing, and in a case where the magnitude of the slope of a piecewise linear function is larger than 1.0, tone conversion of the image causes redundant tone allocation.

Figure 5A:
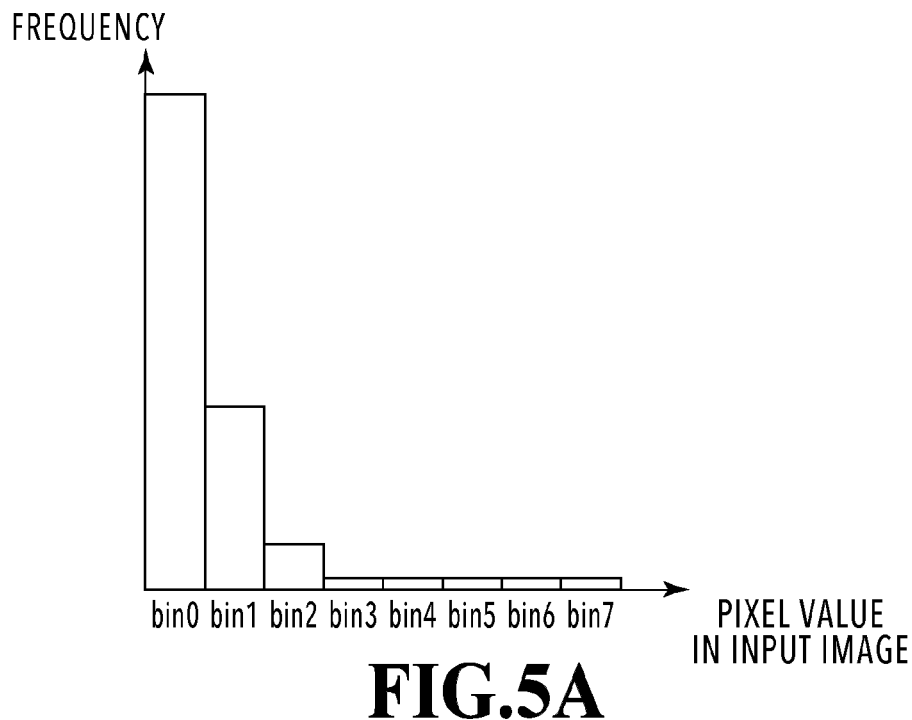
FIG. 5A is a diagram showing an example of a histogram of an input image where pixels concentratedly belong to a particular piece.
Figure 5B:
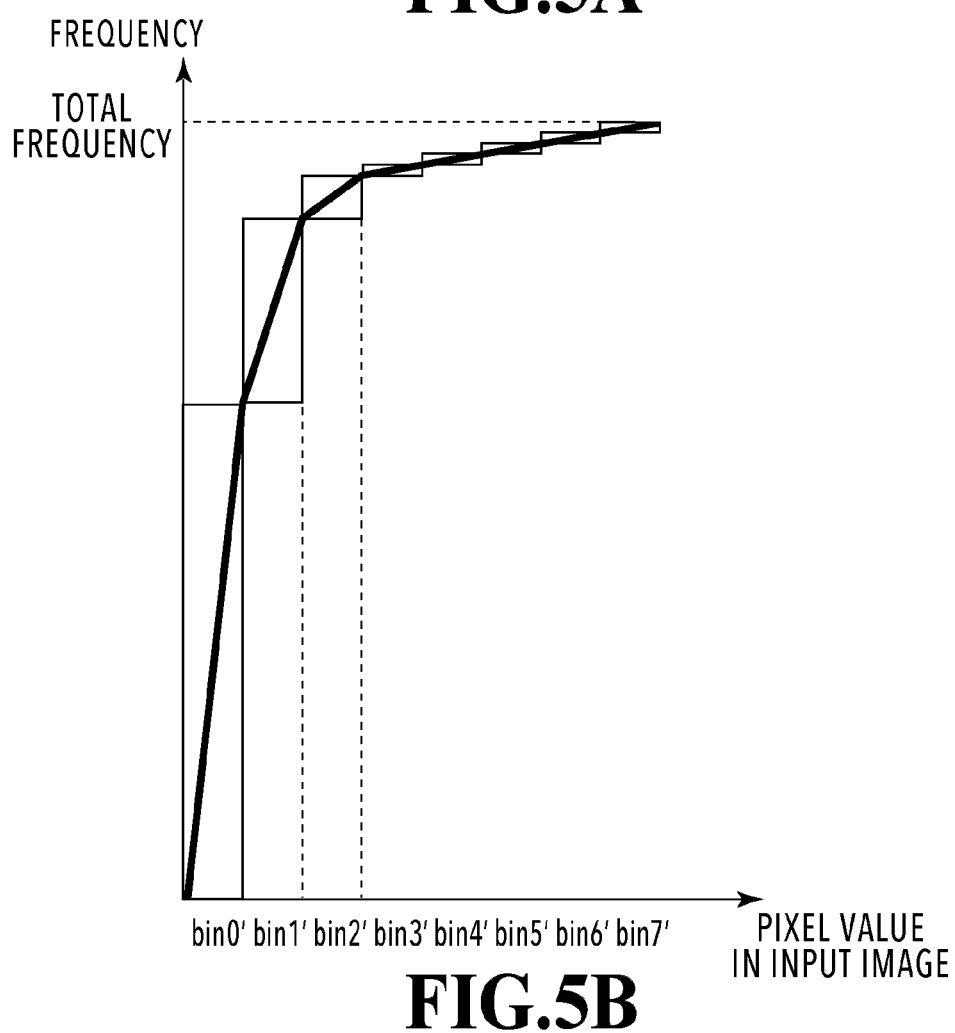
FIG. 5B is a diagram showing an example of a cumulative histogram obtained by cumulatively adding the frequencies of the respective bins in the histogram shown in FIG. 5A.

FIGS. 5A and 5B are diagrams showing an example of a histogram and a cumulative histogram of an input image where some pixels belong to a particular piece concentratedly. Specifically, FIG. 5A shows an example of a histogram of an input image where some pixels belong to a particular piece concentratedly, and FIG. 5B shows an example of a cumulative histogram in which the frequencies of the bin0 to the bin7 in the histogram shown in FIG. 5A are cumulatively added. In the histogram shown in FIG. 5A, there are pixels concentratedly belonging to the bin0 and the bin1. As a result, as shown in FIG. 5B, in the piecewise linear function, which is a conversion function used for tone conversion, most of the tone values as the output values are allocated to the bin0' and the bin1'.

Figure 6:
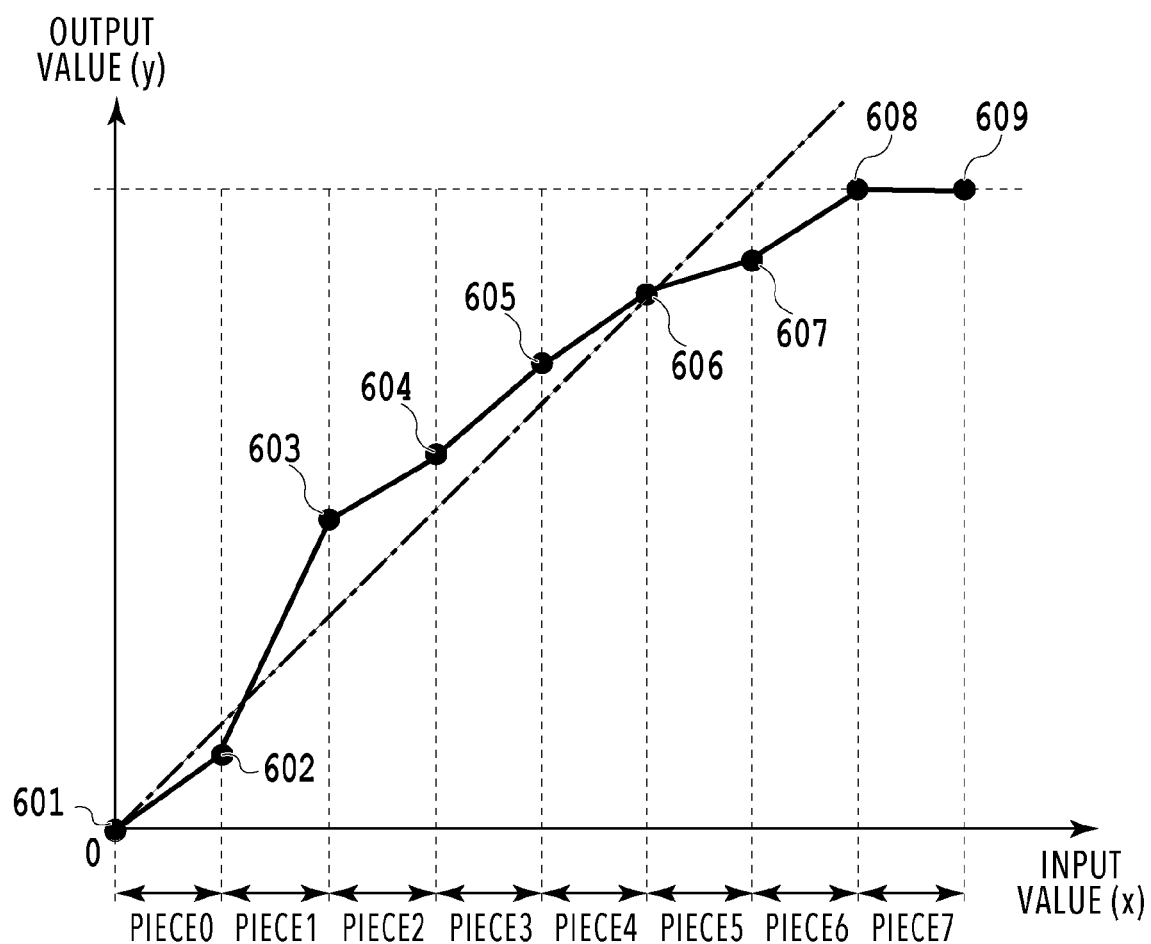
FIG. 6 is a diagram showing an example of a piecewise linear function obtained by a function obtainment unit according to the first embodiment.
Figure 7:
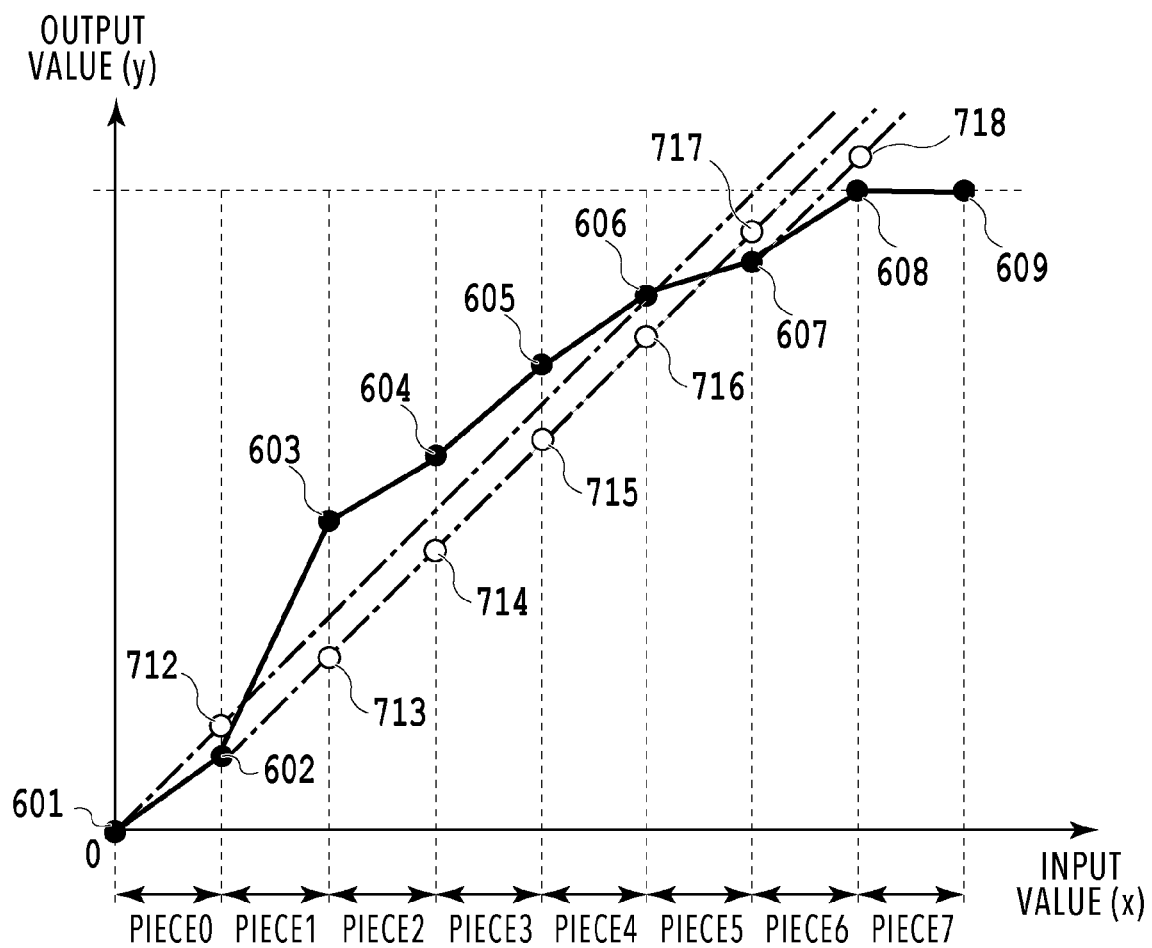
FIG. 7 is a diagram illustrating an example of a piecewise linear function correction method according to the first embodiment.
Figure 8:
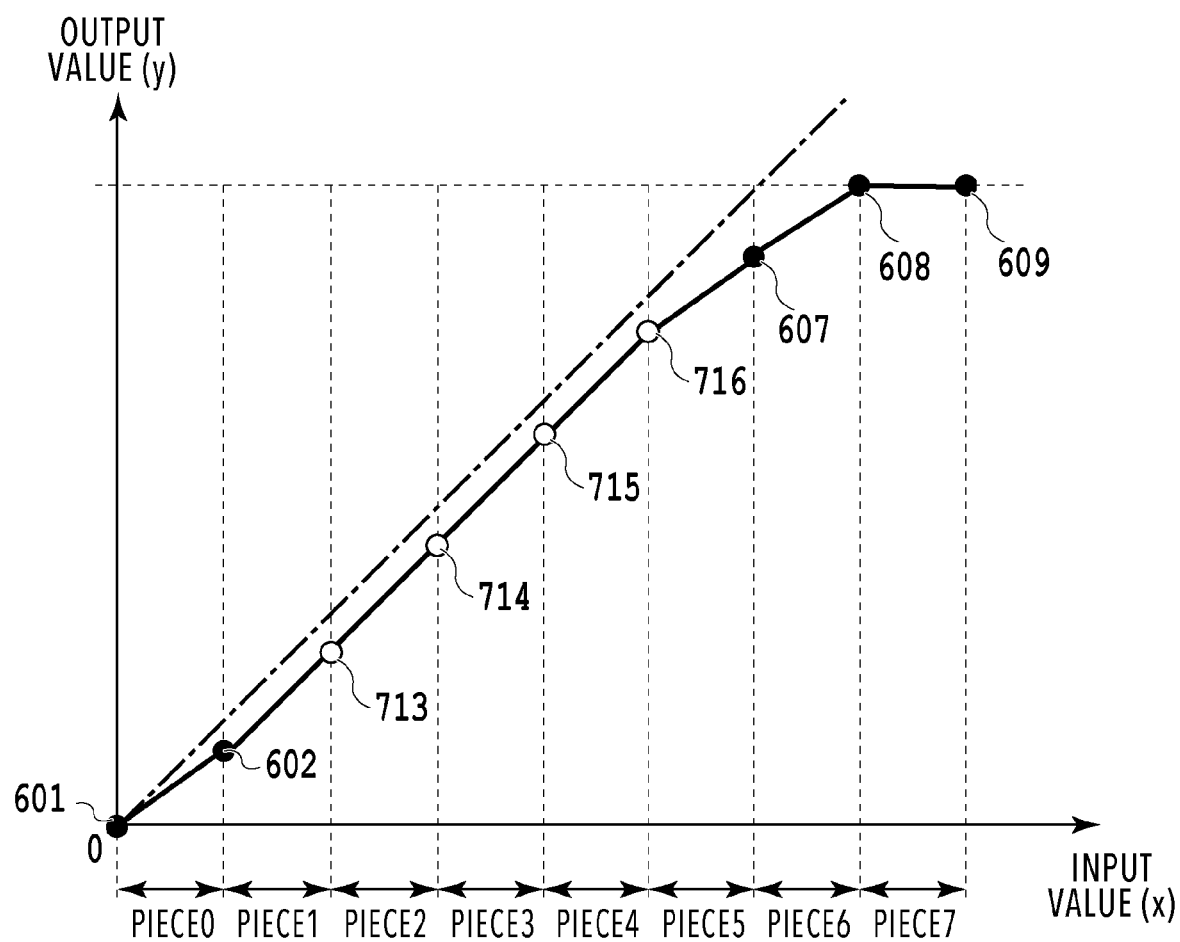
FIG. 8 is a diagram showing an example of a piecewise linear function after correction processing by a first correction unit and a second correction unit according to the first embodiment.

With reference to FIGS. 6 to 8, a description is given of a piecewise linear function correction method according to the first embodiment. FIG. 6 is a diagram showing an example of a piecewise linear function obtained by the function obtainment unit 103 according to the first embodiment. In the piecewise linear function shown in FIG. 6, for each of eight pieces from a piece 0 to a piece 7, an output value corresponding to the smallest input value (hereinafter referred to as a start point) of the piece is defined, and in FIG. 6, the output values of the respective start points are denoted by black points 601 to 608 (hereinafter referred to as "control points"). Also, in FIG. 6, the output value corresponding to the largest input value (hereinafter referred to as an "end point") of the piece 7 is denoted by a black point 609. As shown in FIG. 6, the output value of the start point of one of neighboring pieces and the output value of the end point of the other one of the neighboring pieces are the same value, and the points 602 to 608 correspond to such values.

In FIG. 6, the straight line indicated by a dot-dash line is a straight line whose start point is the point 601 and which is such that the input value and the output value are the same value, i.e., a straight line such that y=x. In other words, the straight line is a straight line that passes through the point 601 and has a slope of 1.0. This straight line is displayed accessorily to help grasp the shape of the piecewise linear function indicated by the solid line passing through the points from the point 601 to the point 609, and is hereinafter referred to as an accessory line. In FIG. 6, the slope of the line segment connecting the point 602 and the point 603, which is the tone characteristics of the piece 1, is greater than the slope (1.0) of the accessory line. As described above, in the present embodiment, the size of the range of possible pixel values for pixels belonging to each bin of a histogram is equal to the size of the range of possible pixel values for each pixel in an output image. Thus, the slope of the line segment connecting the point 602 and the point 603, which is the tone characteristics of the piece 1, being greater than the slope (1.0) of the accessory line means that redundant tone allocation is occurring in the piece 1. Also, the slope of the line segment connecting the point 601 and the point 602 and the slope of the line segment connecting the two points of each adjacent ones of the point 603 to the point 609, which are the tone characteristics of the piece 0 and the pieces 2 to 7, are smaller than the slope of the accessory line. This means that tone conversion may cause tone crushing in the piece 0 and the pieces 2 to 7.

With reference to FIG. 7, a description is given of a method for making such redundant tone allocation better, i.e., a method for correcting the piecewise linear function obtained by the function obtainment unit 103. FIG. 7 is a diagram illustrating an example of the piecewise linear function correction method according to the first embodiment. In FIG. 7, configurations that are the same as those in FIG. 6 are denoted by the same reference numerals as those used in FIG. 6 and are not described here. White points 712 to 718 shown in FIG. 7 are points corresponding to values calculated in the process of the processing to be described later. Also, for the sake of illustration, FIG. 7 shows two accessory lines in addition to the one in FIG. 6, showing three accessory lines in total.

The correction of the piecewise linear function obtained by the function obtainment unit 103 is performed by the first correction unit 104 and the second correction unit 105. Specifically, for example, the correction processing performed by the first correction unit 104 and the second correction unit 105 takes the piece 0 as the first processing target piece and then processes its neighboring piece next, thus performing the processing sequentially from the piece 0 to the piece 7. Taking the piece 0 as the first processing target piece is merely an example, and the present disclosure is not limited to this. For example, the correction processing performed by the first correction unit 104 and the second correction unit 105 may take the piece 7 as the first processing target piece and then process its neighboring piece next, thus performing the processing sequentially from the piece 7 to the piece 0.

First, taking the piece 0 as the first processing target piece, the first correction unit 104 compares the slope of the piecewise linear function in the piece 0, i.e., the slope of the line segment connecting the point 601 and the point 602, with the slope of the accessory line, which is the upper limit value for the slope. In a case where the slope of the piecewise linear function in the processing target piece is equal to or smaller than the slope of the accessory line, the first correction unit 104 ends the processing without correcting the piecewise linear function in the processing target piece. Specifically, in the piecewise linear function exemplified in FIG. 7, the slope of the piecewise linear function in the piece 0 is equal to or smaller than the slope of the accessory line, and thus, the first correction unit 104 ends the processing without correcting the piecewise linear function in the piece 0. Note that in a case where the slope of the piecewise linear function in a processing target piece is equal to or smaller than the slope of the accessory line, the second correction unit 105 does not perform processing, and the correction processing by the second correction unit 105 is omitted.

The above-described processing by the first correction unit 104 can be said to be the following processing. First, the first correction unit 104 draws a straight line from the point 601 at a slope of 1 and finds the value of the point 712 corresponding to the end point of the piece 0 (the start point of the piece 1). Next, the first correction unit 104 compares the value of the point 712 thus found with the value of the point 602 corresponding to the start point of the piece 1 of the piecewise linear function, which is indicated by the solid line, and then selects the point 602 with the smaller value, i.e., the smaller y-coordinate. In this case, the linear function corresponding to the line segment connecting the point 601 and the selected point 602 is the piecewise linear function for the piece 0 after the correction processing by the first correction unit 104. Thus, as a result, the first correction unit 104 ends the processing without correcting the piecewise linear function for the piece 0.

Next, taking the piece 1 as the processing target piece, the first correction unit 104 compares the slope of the piecewise linear function in the piece 1, i.e., the slope of the line segment connecting the point 602 and the point 603, with the slope of the accessory line, which is the upper limit value for the slope. In a case where the slope of the piecewise linear function in the processing target piece is greater than the slope of the accessory line, the first correction unit 104 corrects the piecewise linear function for the processing target piece so that the piecewise linear function may pass through the start point of the processing target piece and have a slope equal to the slope of the accessory line, i.e., the upper limit value for the slope. Specifically, in FIG. 7, the slope of the piecewise linear function in the piece 1 is larger than the slope of the accessory line, and thus, the first correction unit 104 corrects the piecewise linear function for the piece 1 so that the piecewise linear function may pass through the point 602, which is the start point of the piece 1, and have a slope equal to the slope of the accessory line. As a result of the correction processing by the first correction unit 104, the piecewise linear function for the piece 1 is corrected to a linear function corresponding to a line segment connecting the point 602 and the point 713. Note that in a case where the slope of the piecewise linear function in the processing target piece is larger than the slope of the accessory line, the second correction unit 105 performs correction processing after the correction processing by the first correction unit 104.

The second correction unit 105 first calculates an output value corresponding to the point 713, which is the end point of the piecewise linear function for the piece 1 after the correction of the first correction unit 104. Next, the second correction unit 105 corrects the piecewise linear function for the piece 2, which is the next processing target after the piece 1, i.e., the linear function corresponding to the line segment connecting the point 603 and the point 604, to a linear function corresponding to a line segment connecting the point 713 and the point 604 (not shown). The correction processing by the second correction unit 105 yields a piecewise linear function corrected up to the piece 1.

The above-described processing by the first correction unit 104 and the second correction unit 105 can be said to be the following processing. First, the first correction unit 104 draws a straight line from the point 602 at a slope of 1 and finds the value of the point 713 corresponding to the end point of the piece 1 (the start point of the piece 2). Next, the first correction unit 104 compares the value of the point 713 thus found with the value of the point 603 corresponding to the start point of the piece 2 of the piecewise linear function, which is indicated by the solid line, and then selects the point 713 with the smaller value, i.e., the smaller y-coordinate. In this case, the linear function corresponding to the line segment connecting the point 602 and the selected point 713 is the piecewise linear function for the piece 1 after the correction processing by the first correction unit 104. Also, the linear function corresponding to the line segment connecting the selected point 713 and the point 604 is the piecewise linear function for the piece 2 after the correction processing by the second correction unit 105.

Next, taking the piece 2 as the processing target piece, the first correction unit 104 compares the slope of the corrected piecewise linear function in the piece 2, i.e., the slope of the linear function corresponding to a line segment connecting the point 713 and the point 604 (not shown), with the slope of the accessory line, which is the upper limit value for the slope. In FIG. 7, the slope of the corrected piecewise linear function in the piece 2 is larger than the slope of the accessory line, and thus, the first correction unit 104 corrects the piecewise linear function for the piece 2 so that the piecewise linear function may pass through the point 713, which is the corrected start point of the piece 2, and have a slope equal to the slope of the accessory line. In other words, the piecewise linear function for the piece 2 is corrected by the correction processing by the first correction unit 104 to a linear function corresponding to a line segment connecting the point 713 and the point 714. After the correction processing by the first correction unit 104, the second correction unit 105 first calculates an output value corresponding to the point 714, which is the end point of the piecewise linear function for the piece 2 after the correction of the first correction unit 104. Next, the second correction unit 105 corrects the piecewise linear function for the piece 3, which is the next processing target after the piece 2, i.e., the linear function corresponding to the line segment connecting the point 604 and the point 605, to a linear function corresponding to a line segment connecting the point 714 and the point 605 (not shown). The correction processing by the second correction unit 105 yields a piecewise linear function corrected up to the piece 2.

The above-described processing by the first correction unit 104 and the second correction unit 105 can be said to be the following processing. First, the first correction unit 104 draws a straight line from the point 713 at a slope of 1 and finds the value of the point 714 corresponding to the end point of the piece 2 (the start point of the piece 3). Next, the first correction unit 104 compares the value of the point 714 thus found with the value of the point 604 corresponding to the start point of the piece 3 of the piecewise linear function, which is indicated by the solid line, and then selects the point 714 with the smaller value, i.e., the smaller y-coordinate. In this case, the linear function corresponding to the line segment connecting the point 713 and the selected point 714 is the piecewise linear function for the piece 2 after the correction processing by the first correction unit 104. Also, the linear function corresponding to the line segment connecting the selected point 714 and the point 605 is the piecewise linear function for the piece 3 after the correction processing by the second correction unit 105.

Then, the image processing apparatus 100 performs the same correction processing as that described above by sequentially taking the piece 3 to the piece 7 as the processing target. Note that because there is no processing target piece after the piece 7, the processing by the second correction unit 105 may be omitted for the piece 7 in a case where the piece 7 is the processing target piece, or the piece 7 may be not taken as a processing target piece after the piece 6 is taken as a processing target piece. The processing described above with reference to FIGS. 6 and 7 can be generally described as follows using mathematical formulae. In the following description, M is the total number of control points of the piecewise linear function obtained by the function obtainment unit 103. Also, i is an integer greater than 0 and less than M and is an index variable used for explanatory purposes. Also, F(i) is a control point of the piecewise linear function in a piece i before correction, and G(i) is a control point of the piecewise linear function in the piece i after correction. Also, x(P) is the value of the x-coordinate of a point P, and y(P) is the value of the y-coordinate of a point P. Also, a is the predefined upper limit value for the slope and is the slope of the accessory line described above. D(i) is the width of the piece i, and min( ) is a function that outputs the smallest one of inputted explanatory variables as an objective variable.

In a case where i is 0, the uncorrected control point for the piece i of the uncorrected piecewise linear function is set to a corrected control point as is. Specifically, in a case where i is 0, a corrected control point is calculated by Formula (1) below:

$$G(i)=F(i). \quad \text{Formula (1)}$$

F(0) and G(0) correspond to the point 601 exemplified in FIG. 7.

In a case where i is 1 or greater, first, the coordinates of a point Q are found. Specifically, the x-coordinate of the point Q is equivalent to the x-coordinate of the uncorrected control point of the piece i of the piecewise linear function, and is equivalent to the value of the x-coordinate corresponding to the border between the processing target piece i and a piece i−1, which is the processing target piece immediately before the processing target (hereinafter also referred to as a "border value"). Also, the y-coordinate of the point Q is equivalent to the y-coordinate of a point where a half-line drawn from the corrected control point of the piece i−1 of the piecewise linear function at the slope a intersects with the end point of the same piece. Specifically, the values of the x-coordinate and the y-coordinate of the point Q are calculated by Formulae (2) and (3) below:

$$x(Q)=x(F(i))=x(F(i-1))+D(i-1), \text{ and} \quad \text{Formula (2)}$$

$$y(Q)=y(F(i-1))+a \times D(i-1). \quad \text{Formula (3)}$$

Next, the coordinates of the point G(i) are found. Specifically, the values of the x-coordinate and the y-coordinate of the point G(i) are calculated by Formulae (4) and (5) below:

$$x(G(i))=x(F(i)), \text{ and} \quad \text{Formula (4)}$$

$$y(G(i))=\min(y(F(i)),y(Q)). \quad \text{Formula (5)}$$

The computation from Formulae (2) to (5) are repeated while incrementing i until i, which is 1 at first, reaches M−1.

FIG. 8 is a diagram showing an example of a piecewise linear function after the correction processing by the first correction unit 104 and the second correction unit 105 according to the first embodiment. Specifically, FIG. 8 is a diagram showing an example of a piecewise linear function after the piecewise linear function correction processing is performed on each piece from the piece 0 to the piece 7. In FIG. 8, configurations that are the same as those in FIG. 6 or 7 are denoted by the same reference numerals as those used in FIG. 6 or 7. In the corrected piecewise linear function exemplified in FIG. 8, the slope of the piecewise linear function is 1.0 for all of the pieces 1 to 4. In other words, out of the pieces 0 and 2 to 7 in which tone conversion may possibly cause tone crushing, improvements have been made for the pieces 2 to 4 so that tone conversion may not cause tone crushing. Also, as to the piece 5, the slope of the piecewise linear function in the piece 5 is larger than before the correction, and an improvement has been made so that tone conversion is less likely to cause tone crushing than before the correction. Note that the piece 1 after the correction is still in the state where tone conversion does not cause tone crushing, and as to the pieces 0, 6, and 7, the possibility of tone conversion causing tone crushing stays about the same before and after the correction.

In other words, in a comparison between FIG. 6 and FIG. 8, the slope of the uncorrected piecewise linear function in the piece 1 shown in FIG. 6 is greater than 1.0. For this reason, redundant tone allocation is performed for the piece 1 as exemplified in FIG. 4B. Also, in the pieces 2 to 4, the slope of the uncorrected piecewise linear function is smaller than 1.0. For this reason, tone crushing may be caused as exemplified in FIG. 4A. By contrast, because the slope of the corrected piecewise linear function shown in FIG. 8 is 1.0 in the piece 1, redundant tone allocation no longer occurs in the piece 1. Also, tones left over as a result of resolving redundant tone allocation to the piece 1 are allocated to the pieces 2 to 4 (or even to 5), thereby overcoming the tone crushing in the pieces 2 to 4.

Also, in a comparison between FIG. 6 and FIG. 8, as exemplified in FIG. 8, the range of objective variables possible for the corrected linear function is similar to the range of objective various possible for the uncorrected piecewise linear function shown in FIG. 6. Thus, without having to renormalize the histogram, the image processing apparatus 100 can easily obtain the corrected piecewise linear function used for tone compression of an input image. Note that there is a case where the magnitude of the slope of the uncorrected piecewise linear function in the last processing target piece, or specifically, for example, the piece 7 in FIG. 6 and the like, is larger than the upper limit value for the slope. In this case, the range of objective variables possible for the corrected piecewise linear function may be smaller than the range of objective variables possible for the uncorrected piecewise linear function shown in FIG. 6. However, even in such a case, redundant tone allocation is simply corrected, and desired tone compression is achieved. Note that in this case, the histogram may be renormalized so that the range of objective variables possible for the corrected piecewise linear function may be the same as the range of objective variables possible for the uncorrected piecewise linear function to correct the corrected piecewise linear function again.

Also, although the slope of the accessory line is 1.0 in the above description, the slope of the accessory line is not limited to 1.0. Specifically, in the present embodiment, the slope of the accessory line is preferably 1.0 in the perspective of correcting redundant tone allocation, but may be less than 1.0 as long as it is a positive value no more than 1.0. In a case where the slope of the accessory line is a positive value less than 1.0, the processing would involve reducing the number of tones allocated to each piece, and further, allocating the tones to the pieces while averaging the number of the allocated tones among the pieces.

Using the piecewise linear function corrected by the first correction unit 104 and the second correction unit 105, the image conversion unit 106 performs tone conversion on the input image data obtained by the image obtainment unit 101. The image output unit 109 outputs the image data obtained by the tone conversion by the image conversion unit 106, as output image data. Specifically, the image output unit 109 outputs the output image data to the auxiliary storage device 204, and the output image data is stored in the auxiliary storage device 204. The image output unit 109 may output the output image data to the display unit 205 to display an output image on a display device such as a liquid crystal display or an LED. Also, the image output unit 109 may output the output image data to an external apparatus via the communication unit 207.

In this case, the external apparatus receiving the output image data may obtain image data corresponding to the original input image data by performing reversion conversion on the received output image data to reverse the tone conversion executed by the image processing apparatus 100. In a case where the external apparatus performs reverse conversion to reverse the tone conversion, the image processing apparatus 100 may output the output image data in association with information necessary for the conversion to reverse the tone conversion, such as information indicating the corrected piecewise linear function used for the tone conversion. In this case, for example, the communication unit 207 may be configured to transmit the output image data and the information necessary for conversion to reverse the tone conversion by using channels different from each other. Also, for example, the communication unit 207 may be configured so that the output image data and the information necessary for conversion to reverse the tone conversion may be transmitted on the same channel by using a protocol or format capable of identifying them from each other. Also, for example, a configuration may be employed in which the external apparatus requests the image processing apparatus 100 via the communication unit 207 for the information necessary for the conversion to reverse the tone conversion, and the information stored in the RAM 203 or the like is read.

Figure 9:
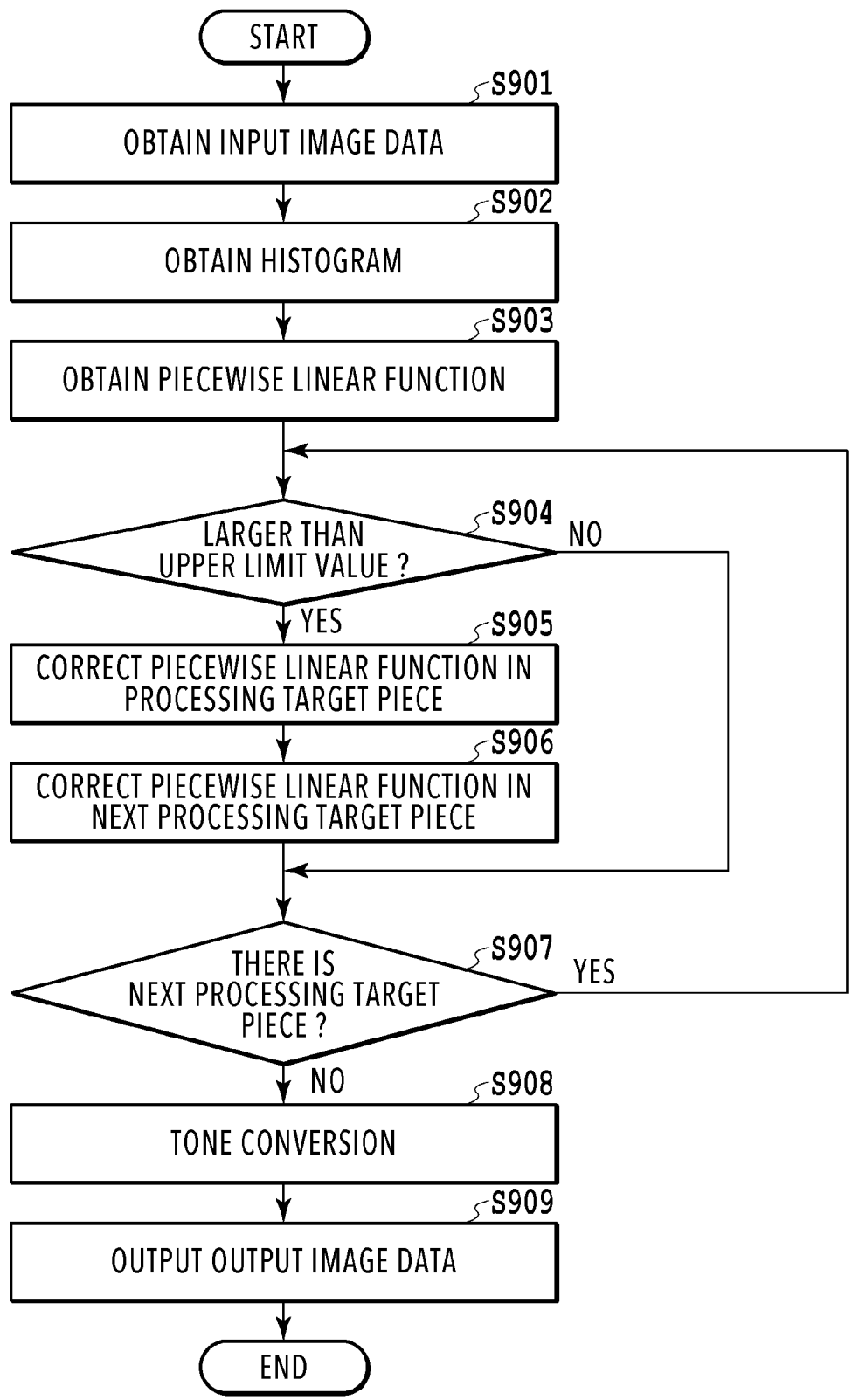
FIG. 9 is a flowchart showing an example of how processing is performed by the image processing apparatus according to the first embodiment.

With reference to FIG. 9, the operation of the image processing apparatus 100 is described. FIG. 9 is a flowchart showing an example of how processing is performed by the image processing apparatus 100 according to the first embodiment. Note that the letter "S" in the following description denotes a step. First, in S901, the image obtainment unit 101 obtains input image data. Next, in S902, the histogram obtainment unit 102 obtains a histogram of the input image. Next, in S903, the function obtainment unit 103 obtains a piecewise linear function based on a cumulative histogram.

Next, in S904, the first correction unit 104 selects a processing target piece and determines whether the magnitude of the slope of the piecewise linear function in the processing target piece is larger than the predetermined upper limit value for the slope, i.e., the magnitude of the slope of the accessory line. Specifically, for example, the first correction unit 104 selects the piece 0 shown in FIG. 6 as the first processing target piece, and determines whether the magnitude of the slope of the piecewise linear function in the piece 0 is larger than the upper limit value for the slope. If it is determined in S904 that the magnitude of the slope of the piecewise linear function in the processing target piece is larger than the predetermined upper limit value for the slope, in S905, the first correction unit 104 corrects the piecewise linear function for the processing target piece.

The processing in S904 and S905 is described below using Formulae (1) to (5) described above. First, only in a case where the piece 0 exemplified in FIG. 6 is selected as the first processing target, the first correction unit 104 initializes the index variable i to 0, executes the computation of Formula (1), and sets the point G(0) to F(0). Next, the first correction unit 104 increments the value of the index variable i and finds the coordinates of the point G(i) using Formulae (1) to (5). In a case where the y-coordinate of the point G(i) is the y-coordinate of the point Q, it means that the magnitude of the slope of the piecewise linear function in the processing target piece is larger than the upper limit value for the slope. Thus, in this case, the first correction unit 104 corrects the piecewise linear function in the processing target piece to a linear function corresponding to a line segment connecting a point G(i−1) and the point G(i). A case where the y-coordinate of the point G(i) is the y-coordinate of the point F(i) will be described later.

After S905, in S906, the second correction unit 105 corrects the piecewise linear function for the next piece to be processed after the current processing target piece. The processing in S906 is described using Formulae (1) to (5) described above. The second correction unit 105 corrects the piecewise linear function for the next piece to be processed after the current processing target piece to a line segment connecting the point G(i) and the point F(i+1). After S906, in S907, for example, the first correction unit 104 determines whether there is a next piece to be processed after the current processing target piece. The processing in S907 is equivalent to processing of determining whether the value of i is less than M−1. If it is determined in S907 that there is a next piece to be processed after the current processing target piece, the image processing apparatus 100 proceeds back to the processing in S904 to execute the processing in S904. Specifically, in the above case, the image processing apparatus 100 proceeds back to the processing in S904, selects the next piece to be processed as the current processing target piece, and performs the processing in and after S904. In other words, in the above case, the image processing apparatus 100 proceeds back to the processing in S904, increments the value of the index variable i, and executes the processing after the increment described above.

The image processing apparatus 100 executes processing in S907 if it is determined in S904 that the magnitude of the slope of the piecewise linear function in the processing target piece is not larger than the upper limit value for the slope, i.e., equal to or less than the upper limit value. In other words, in a case where the processing target piece is applicable to the above case, the image processing apparatus 100 executes processing in S907 without the piecewise linear function being corrected by the first correction unit 104 and the second correction unit 105. Note that a case where the y-coordinate of the point G(i) is the y-coordinate of the point F(i) is equivalent to a case where it is determined that the magnitude of the slope of the piecewise linear function in the processing target piece is not larger than the upper limit value for the slope.

If it is determined in S907 that there is no next piece to be processed after the current processing target piece, in S908, the image conversion unit 106 performs tone conversion on the input image data using the corrected piecewise linear function. After S908, in S909, the image output unit 109 outputs the tone-converted image data as output image data. After S909, the image processing apparatus 100 ends the processing in the flowchart shown in FIG. 9.

As thus described, according to the image processing apparatus 100, a piecewise linear function used for image tone compression can be corrected easily without having to renormalize the histogram. Also, tone compression processing using the corrected piecewise linear function can improve redundant tone allocation. Also, tones left over as a result of improving redundant tone allocation can be sequentially allocated to the other pieces, thereby making the tone characteristics of those pieces better.

Although a mode in which input image data is still image data is described as an example in the present embodiment, input image data may be moving image data. In a case where input image data is moving image data, the image processing apparatus 100 executes the above-described processing for each one of a plurality of frames included in the moving image data obtained by the image obtainment unit 101. However, in a case where moving image data is transmitted from an image capture apparatus successively, a histogram corresponding to a certain frame may not be generated in time for the start of the later processing. In such a case, an uncorrected piecewise linear function corresponding to the frame cannot be generated from the histogram of that frame. Because the main focus of the present disclosure is a method for correcting a piecewise linear function to be used for tone conversion, an uncorrected piecewise linear function to be the base may be obtained using any of various methods, and an uncorrected piecewise linear function may include approximation or the like. Thus, in the case described above, a configuration may be employed in which a histogram obtained from a past frame, preferably about one or two frames prior, is used as an approximate histogram to generate an uncorrected piecewise linear function.

Also, although the single image processing apparatus 100 has all of the units shown in FIG. 1 in the present embodiment described above, the image processing apparatus 100 may be configured as an image processing system which has a first apparatus having some of the units shown in FIG. 1 and a second apparatus having the rest of the units.

Also, in the mode described in the present embodiment, as an example, the piecewise linear function correction processing is performed sequentially from a smaller bin to a larger bin, or in other words, from a piece to which pixels with small pixel values belong to a piece to which pixels with large pixel values belong. However, the image processing apparatus 100 may perform the piecewise linear function correction processing on each processing target piece sequentially from a larger bin to a smaller bin. In this case, the processing may be modified appropriately as follows for example: the right end of a piece (an end point closer to the larger bin) is used as a start point, and an end point (an end point closer to the smaller bin) is temporarily determined according to the upper limit value for the slope, and between the end point temporarily determined and its corresponding uncorrected control point, one with the larger y-coordinate is selected.

Second Embodiment

Figure 10:
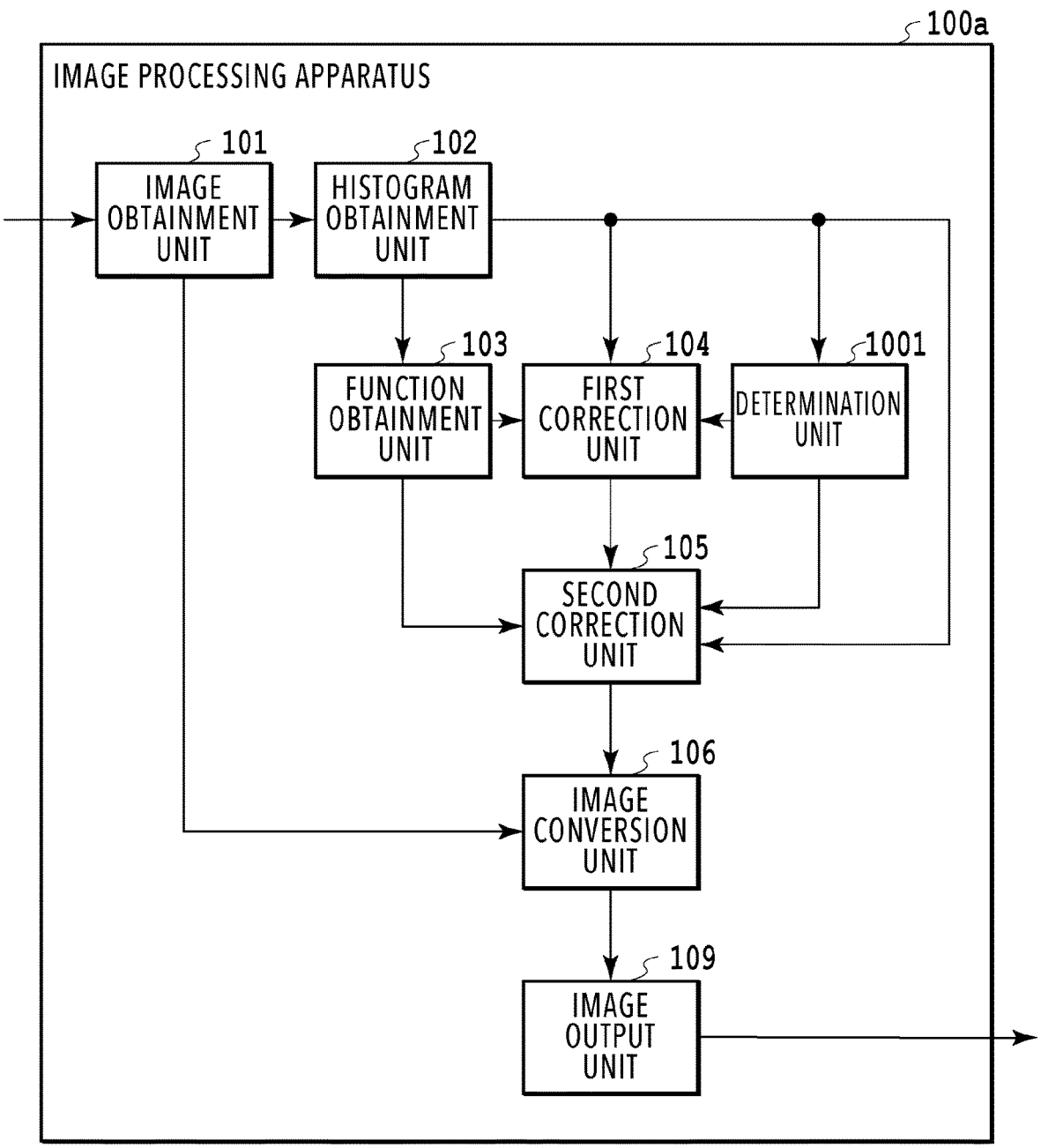
FIG. 10 is a block diagram showing an example functional block configuration of an image processing apparatus according to a second embodiment.
Figure 11:
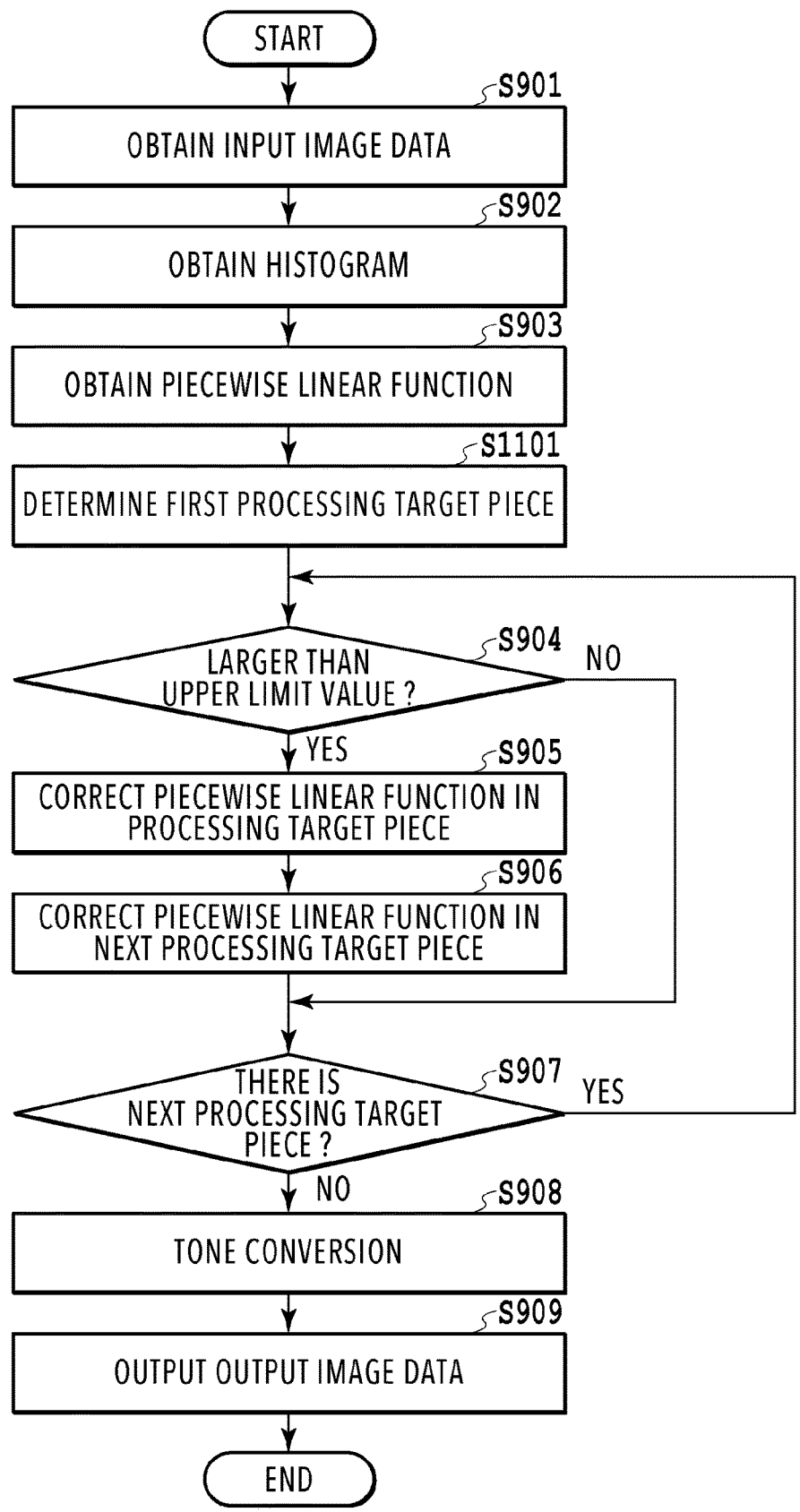
FIG. 11 is a flowchart showing an example of how processing is performed by the image processing apparatus according to the second embodiment.

With reference to FIGS. 10 and 11, an image processing apparatus 100a according to a second embodiment is described. The image processing apparatus 100 according to the first embodiment performs the piecewise linear function correction processing sequentially from a smaller bin to a larger bin or from a larger bin to a smaller bin in a histogram, and the direction is predefined. By contrast, the image processing apparatus 100a according to the second embodiment has a function to determine, based on a histogram, whether to perform the correction processing sequentially from a smaller bin to a larger bin or to perform the correction processing sequentially from a larger bin to a smaller bin.

FIG. 10 is a block diagram showing an example functional block configuration of the image processing apparatus 100a according to the second embodiment. The image processing apparatus 100a has the image obtainment unit 101, the histogram obtainment unit 102, the function obtainment unit 103, a determination unit 1001, the first correction unit 104, the second correction unit 105, the image conversion unit 106, and the image output unit 109. In other words, the image processing apparatus 100a is the image processing apparatus 100 according to the first embodiment additionally having the determination unit 1001. In the following description, configurations in FIG. 10 that are the same as those shown in FIG. 1 are denoted by the same reference numerals as those used in FIG. 1 to omit descriptions. To be more specific, the image obtainment unit 101, the histogram obtainment unit 102, the function obtainment unit 103, the first correction unit 104, the second correction unit 105, the image conversion unit 106, and the image output unit 109 according to the second embodiment are not described here because they are the same as those according to the first embodiment. The processing performed by the units in the image processing apparatus 100a are, like in the first embodiment, implemented by, for example, hardware in the image processing apparatus 100a, such as an ASIC or FPGA. The processing may be implemented by software executed by the hardware exemplified in FIG. 2.

The determination unit 1001 determines a bin (a piece) to set as the first processing target. Specifically, the determination unit 1001 obtains the magnitude of the slope of the piecewise linear function in the smallest bin among all the possible processing target pieces (hereinafter referred to as the "smallest bin"), i.e., the bin to which a pixel with the smallest pixel value belongs. The determination unit 1001 also obtains the magnitude of the slope of the piecewise linear function in the largest bin among all the possible processing target pieces (hereinafter referred to as the "largest bin"), i.e., the bin to which a pixel with the largest pixel value belongs. Further, in a case where the magnitude of the slope of the piecewise linear function in the smallest bin is larger than the upper limit value for the slope and the magnitude of the slope of the piecewise linear function in the largest bin is equal to or smaller than the upper limit value for the slope, the determination unit 1001 determines that the smallest bin is the bin (piece) to be processed first. Meanwhile, in a case where the magnitude of the slope of the piecewise linear function in the largest bin is larger than the upper limit value for the slope and the magnitude of the slope of the piecewise linear function in the smallest bin is equal to or smaller than the upper limit value for the slope, the determination unit 1001 determines that the largest bin is the bin (piece) to be processed first.

Determining the first processing target bin this way enables output of output image data that uses a thorough range of possible pixel values for the output image data. Also, determining the first processing target bin this way can improve redundant tone allocation, and tones left over as result of the improvement of the redundant tone allocation can be sequentially allocated to the other pieces, thereby making the tone characteristics of those pieces better.

Also, for example, in a case where the magnitude of the slope of the piecewise linear function is larger than the upper limit value for the slope in both of the smallest bin and the largest bin, the determination unit 1001 determines that the bin with the larger magnitude of slope is the first processing target bin (piece). Determining the first processing target bin this way enables output of output image data which uses a larger range of possible pixel values for the output image data. Determining the first processing target bin this way also enables improvement of a piece having more tones redundantly allocated thereto. Further, more tones left over as a result of the improvement of the redundant tone allocation can be sequentially allocated to the other pieces, thus making the tone characteristics of those pieces better.

Also, for example, in a case where the magnitude of the slope of the piecewise linear function is equal to or smaller than the upper limit value for the slope in both of the smallest bin and the largest bin, the determination unit 1001 determines the first processing target bin (piece) as follows. For example, the determination unit 1001 first identifies the bin in which the magnitude of the slope of the piecewise linear function is the largest among all the possible processing target bins. Next, the determination unit 1001 determines that one of the smallest and largest bins which is closer to the bin identified above is the first processing target bin (piece). In a case where the magnitude of the slope of the piecewise linear function is equal to or smaller than the upper limit value for the slope in both of the smallest bin and the largest bin, the determination unit 1001 may determine the first processing target bin (piece) as follows. For example, the determination unit 1001 first identifies, from all the possible processing target bins, a bin whose total frequency exceeds a half of the total frequency of the bin with the largest total frequency in a cumulative histogram. Next, the determination unit 1001 determines that one of the smallest and largest bins which is closer to the bin identified above is the first processing target bin (piece). Determining the piece to be processed first this way enables output of output image data that represents the features of the input image.

FIG. 11 is a flowchart showing an example of how processing is performed by the image processing apparatus 100a according to the second embodiment. In the following description, the steps in FIG. 11 that are the same as those in FIG. 9 are denoted by the same reference numerals as those used in FIG. 9 to omit their descriptions. First, the image processing apparatus 100a executes the processing from S901 to S903. After S903, in S1101, the determination unit 1001 determines the first processing target bin (piece). After S1101, the image processing apparatus 100a executes the processing from S904 to S909 as needed and ends the processing of the flowchart shown in FIG. 11.

As thus described, according to the image processing apparatus 100a, a piecewise linear function used for image tone compression can be corrected easily without having to renormalize the histogram. Also, redundant tone allocation can be improved by tone compression processing using the corrected piecewise linear function. Also, tones left over as a result of the improvement of the redundant tone allocation are sequentially allocated to the other pieces, thereby making the tone characteristics of those pieces better. The image processing apparatus 100a can particularly make the tone characteristics of each piece even better by properly determining the first processing target piece in the correction of the piecewise linear function.

Note that the above embodiments show an example configuration where still images are temporarily retained in the RAM 203. However, for example, a moving image shooting apparatus that obtains a plurality of temporally successive frames as moving images can also be used as the image processing apparatus 100.

In this case, a frame obtained by the image obtainment unit 101 is passed to the histogram obtainment unit 102, and the function obtainment unit 103 obtains a piecewise linear function from a histogram based on the frame. After necessary corrections are made to the piecewise linear function, the image conversion unit 106 performs tone conversion on the input image using the corrected piecewise linear function.

However, it is conceivable in the above configuration that all the frames are inputted to the image conversion unit 106 before the corrected piecewise linear function is inputted to the image conversion unit 106. Then, in this case, a histogram obtained based on a current frame cannot be used for tone conversion on the current frame. Thus, a configuration is employed in which a histogram obtained based on a past frame, preferably about one or two frames prior, is used as an approximate histogram. The function obtainment unit 103 obtains a piecewise linear function from the histogram obtained based on the past frame. After necessary corrections are made to the piecewise linear function, the image conversion unit 106 performs tone conversion on the current frame using the corrected piecewise linear function.

Also, in the above embodiments, the function obtainment unit 103 obtains a piecewise linear function from a histogram based on an input image. However, a configuration not using an input image is also possible, in which a necessary piecewise linear function is calculated and obtained based on a user instruction and input.

Also, in the above embodiment, the first correction unit 104 and the second correction unit 105 are used to correct a piecewise linear function. However, as a data format for retaining a piecewise linear function, it is also possible to retain only a border value between pieces instead of retaining the values of both a start point and an end point of each piece. In this case, for example, changing a border value corresponding to the value of an end point of a processing target piece automatically changes the value of the start point of the piece to be processed next. Thus, depending on the data format of retaining the piecewise linear function, the correction by the second correction unit 105 is unnecessary, and only the correction by the first correction unit 104 may be performed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to correct a piecewise linear function for image tone compression easily without histogram renormalization.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-006428, filed Jan. 19, 2022 which is hereby incorporated by reference herein in its entirety.

What is claimed is:

1. An image processing apparatus that performs tone conversion on an image, the image processing apparatus comprising:
   one or more hardware processors; and
   one or more memories storing one or more programs configured to be executed by the one or more hardware processors, the one or more programs including instructions for:
   (1) obtaining a piecewise linear function for the tone conversion;
   (2) performing correction, in a case where a magnitude of a slope of the piecewise linear function in a processing target piece is larger than a predefined upper limit value, on the piecewise linear function so as to bring the magnitude of the slope of the piecewise linear function in the processing target piece to the upper limit value by changing a value of an end point of the processing target piece, wherein the correction is performed sequentially on a piece adjacent to the processing target piece, wherein the upper limit value is 1.0; and
   (3) performing the tone conversion on the image using the piecewise linear function after the correction is performed on all the pieces.

2. The image processing apparatus according to claim 1, wherein the piecewise linear function for the tone conversion is obtained based on a histogram of the image.

3. The image processing apparatus according to claim 1, wherein a smallest piece of the piecewise linear function is set as the processing target piece to be processed first, and
   wherein processing is performed sequentially such that a piece adjacent in a direction of increasing piece range is processed next.

4. The image processing apparatus according to claim 3, wherein the one or more programs further include an instruction for:
   determining the smallest piece as the processing target piece to be processed first, in a case where a slope of the piecewise linear function in a largest piece of the piecewise linear function is smaller than the upper limit value.

5. The image processing apparatus according to claim 1, wherein a largest piece of the piecewise linear function is set as the processing target piece to be processed first, and
   wherein processing is performed sequentially such that a piece adjacent in a direction of decreasing piece range is processed next.

6. The image processing apparatus according to claim 5, wherein the one or more programs further include an instruction for:
   determining the largest piece as the processing target piece to be processed first, in a case where a slope of the piecewise linear function in a smallest piece of the piecewise linear function is smaller than the upper limit value.

7. The image processing apparatus according to claim 1, wherein the one or more programs further include an instruction for:
   changing a value of a start point of a next piece to be processed after the processing target piece, in a case where the magnitude of the slope of the piecewise linear function in the processing target piece is larger than the upper limit value.

8. The image processing apparatus according to claim 1, wherein the image is a moving image, and
   wherein the piecewise linear function for the tone conversion is obtained based on a past frame in the moving image.

9. The image processing apparatus according to claim 1, wherein the piecewise linear function for the tone conversion is obtained based on a user instruction.

10. An image processing method that performs tone conversion on an image, the image processing method comprising:
    obtaining a piecewise linear function for the tone conversion;
    performing correction, in a case where a magnitude of a slope of the piecewise linear function in a processing target piece is larger than a predefined upper limit value, on the piecewise linear function so as to bring the magnitude of the slope of the piecewise linear function in the processing target piece to the upper limit value by changing a value of an end point of the processing target piece, wherein the correction is performed sequentially on a piece adjacent to the processing target piece, wherein the upper limit value is 1.0; and performing the tone conversion on the image using the piecewise linear function after the correction is performed on all the pieces, wherein the method is performed by a system comprising a processor and a memory.

11. An image processing system that performs tone conversion on an image, the image processing apparatus comprising:

one or more hardware processors; and one or more memories storing one or more programs configured to be executed by the one or more hardware processors, the one or more programs including instructions for:

(1) obtaining a piecewise linear function for the tone conversion;

(2) performing correction, in a case where a magnitude of a slope of the piecewise linear function in a processing target piece is larger than a predefined upper limit value, on the piecewise linear function so as to bring the magnitude of the slope of the piecewise linear function in the processing target piece to the upper limit value by changing a value of an end point of the processing target piece, wherein the correction is performed sequentially on a piece adjacent to the processing target piece, wherein the upper limit value is 1.0; and (3) performing the tone conversion on the image using the piecewise linear function after the correction is performed on all the pieces.

12. A non-transitory computer-readable storage medium storing a program for causing a computer to perform a control method of an apparatus that performs tone conversion on an image, the control method comprising the steps of:

obtaining a piecewise linear function for the tone conversion;

performing correction in a case where a magnitude of a slope of the piecewise linear function in a processing target piece is larger than a predefined upper limit value, on the piecewise linear function so as to bring the magnitude of the slope of the piecewise linear function in the processing target piece to the upper limit value by changing a value of an end point of the processing target piece, wherein the correction is performed sequentially on a piece adjacent to the processing target piece, wherein the upper limit value is 1.0; and performing the tone conversion on the image using the piecewise linear function after the correction is performed on all the pieces.

* * * * *